April 7, 1964 R. A. SPAULDING ETAL 3,128,371
METHOD OF PREDICTING CURRENT DISTRIBUTION IN AN ELECTROPLATING TANK
Filed Oct. 28, 1957
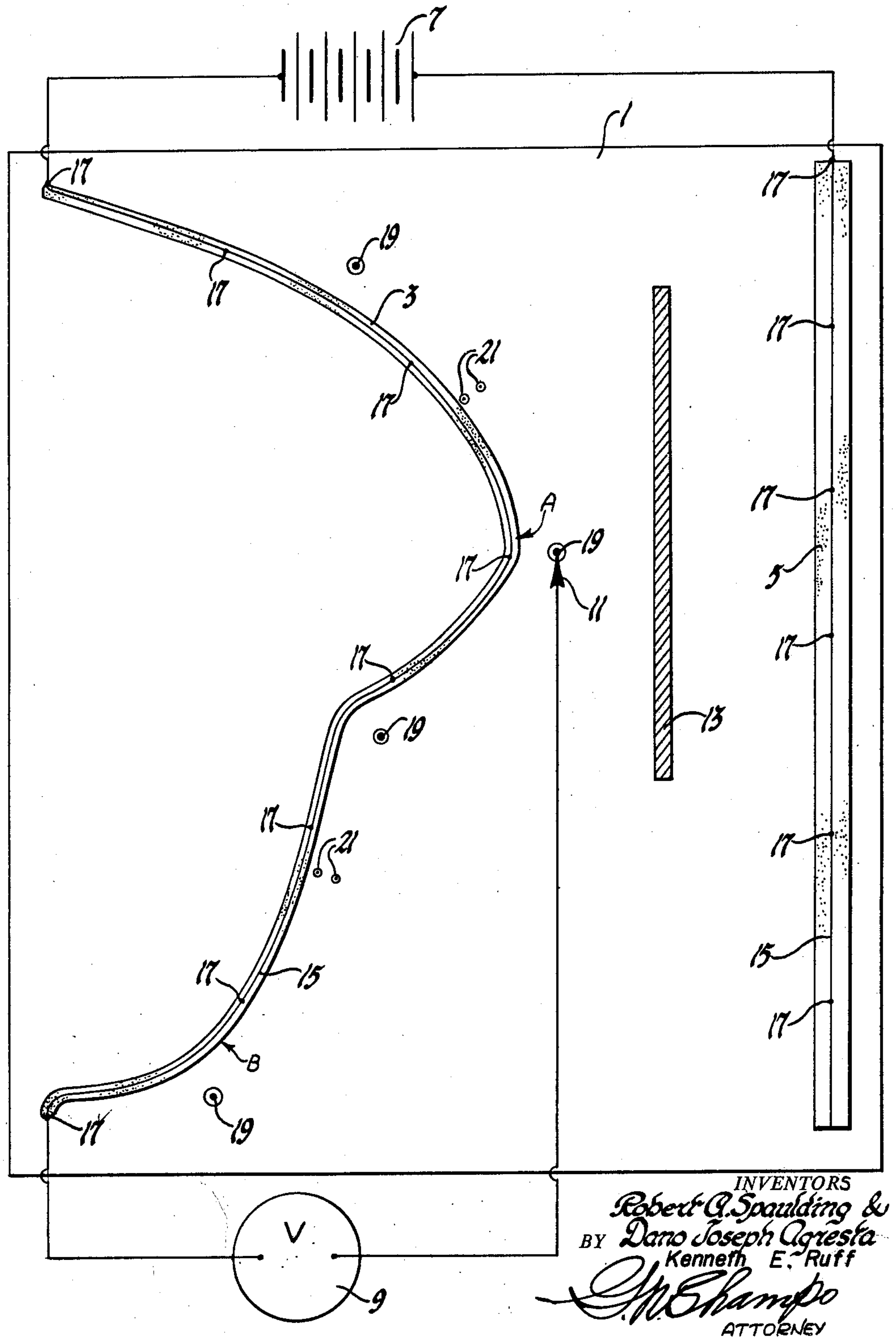
INVENTORS
Robert A. Spaulding &
BY Dano Joseph Agresta
Kenneth E. Ruff
ATTORNEY United States Patent Office 3,128,371

Patented Apr. 7, 1964

3,128,371

METHOD OF PREDICTING CURRENT DISTRIBUTION IN AN ELECTROPLATING TANK

Robert A. Spaulding, Huntington Woods, Dano Joseph Agresta, Warren, and Kenneth E. Ruff, St. Clair Shores, Mich., assignors to General Motors Corporation, Detroit, Mich., a corporation of Delaware Filed Oct. 28, 1957, Ser. No. 692,907

8 Claims. (Cl. 235—61.6)

This invention relates to a method of predicting current distribution on a part in an electroplating tank and more particularly to a dry test method wherein a simple 2-dimensional model of the plating tank and plating components are utilized.

The designing of plating racks and plating tank layouts for optimum efficiency and for conservation of plating material on treated parts has always presented a problem in the past. Such problems have required the plater to have a large amount of experience and a well developed intuition, the usual cut and try methods being relied on to supplement or take the place of such skill. Such procedures have of course always been expensive, time-consuming and generally unsatisfactory in that the plating layout used usually resulted in uneven distribution of plate on the parts being treated and in the inefficient use of facilities.

It is therefore an object of our invention to predict the current distribution on a part to be plated by measuring the voltage drop across a short terminal distance between the anode and the part to be plated as simulated with conducting material on a 2-dimensional conducting sheet.

It is a still further object of our invention to predict the current distribution on a part to be plated by measuring the voltage drop across a 2-dimensional conducting sheet between a point on the part and a point on the conducting sheet a small distance away therefrom.

It is a still further object of our invention to predict the current distribution on a part to be plated by measuring the voltage drop across a 2-dimensional conducting sheet between two spaced points located a small distance away from a point on the part. In is a still further object of our invention to provide a method for simulating baffles and shields within the plating tank by disrupting the conducting surface of the 2-dimensional conducting sheet.

These and other objects of our invention are achieved by representing the cross section of the part to be plated and of the anode with conducting material upon a conducting material upon a conducting surface, the components being located in the same relative position in which they would be located in the plating tank, and measuring the voltage gradient on the conducting surface with reference to a point on the part and at a small distance away therefrom.

The above and other objects of our invention are fully disclosed in the following description when read in conjunction with the drawing on which there is shown a sketch of a typical layout which may be used in performing the current distribution tests of our invention.

Having reference to the drawing there is shown a 2-dimensional layout enabling the prediction of current distribution across a section of a part to be plated in an electroplating tank in accordance with a preferred embodiment of our invention. Each plating problem to be evaluated prior to actual tank electroplating is laid out upon conducting sheet 1 having uniform electrical characteristics to exactly duplicate the proposed tank layout. The conductivity of the sheet is not of great importance except that it must be less conductive than the silver paint or other conducting material which is used to represent the cross section of the part, anode and any other plating components upon the conducting sheet in simulation of the components in the plating tank. We have used with equal success Teledeltos Paper manufactured by the Western Union Telegraph Company and Time-Fax Facsimile Paper supplied by Times-Facsimile Corporation. We have also used glass having a thin conductive coating on the surface supplied by Libby-Owens-Ford Company. The cross section of the part to be plated 3, as positioned in the plating tank, is shown as drawn on the conductive paper 1 in silver paint and the anode 5 is shown as a silver painted strip positioned with respect to the part 3 as it would be in the tank. A voltage is applied between the part 3 and the anode 5 as by means of the power supply 7. A volt meter 9 is connected into the electrical circuit with a probe 11 to enable readings to be made on the conductive paper as more fully described hereinafter. A baffle or shield for blocking the flow of current in the tank is simulated by breaking the continuity of the conducting surface 1 as in area 13.

As shown, one side of the volt meter 9 is connected to the part 3. While we prefer to draw the cross sections of the part 3 and anode 5 upon the sheet 1 using silver paint, it should be realized that other conducting materials such as copper and aluminum may be used in the paint or coating or the cross sections may be formed from thin metal stock such as copper sheet. A conducting paint or coating is preferred since much better contact is obtained with the conducting sheet 1. In order to preclude any voltage drop across the cross sections of the tank components and to facilitate connection of the components in the electrical circuit, we may position a thin wire 15 having good electrical conductivity, i.e., copper, upon the cross sections drawn on sheet 1. The wires 15 are secured by any suitable means, i.e., solder, at spaced points 17 to the cross sections.

We have found that the voltage gradient across the conducting paper 1 as measured on a line perpendicular to and close to a point on the part being investigated 3 is directly proportion to the current density at the point on the part. It therefore follows that the current distribution at various points along the surface of the part can be represented by the voltage drop measured at a predetermined distance along the perpendicular from the points on the part. It has also been found that the current distribution is the same as the plated metal distribution for acid copper and nickel plating solutions.

While we have found that a voltage of substantially any desired value may be applied between the anode 5 and the part 3, we prefer to use a voltage of approximately 10 volts because this is readily available and will give a convenient reading. We have used as high as 60 volts and as low as .6 volt with equally satisfactory results. The voltage used is only limited by convenience, safety, or the tendency of the conductive sheet 1 to be heated by the current flow. As the space between the anode and the part is reduced, the resistance of the system is likewise reduced and a reduction in the voltage applied is desirable. Similarly, we have found that the distance from the part cross section at which voltage drop readings are taken may likewise vary within wide limits though we prefer to make our measurements at points about 0.25″ away from the part cross section surface. Briefly stated, the distance from the part cross section at which voltage drop readings are taken should be relatively short but sufficiently spaced therefrom as to enable accurate measurements of voltage gradient which are proportional to current density. We have found that the accuracy of measurement of the voltage gradient becomes more critical as the points of measurement get closer to the part cross section. Similarly, the proportional relationship between the measured voltage gradient and the current density no longer holds true as the distance between the points of measurement and the part surface becomes relatively great. The pressure applied to the probe 11 when making measurements should be light and relatively constant in order to assure reproducibility of readings.

The preferred method used for conducting the current distribution tests consists of painting a cross section of the part 3 being investigated on the conducting sheet 1 using a silver paint. A cross section of the anode system 5 is similarly painted on the conducting sheet in the same relative position with respect to the part as it would have when located in the plating tank. Thin copper wires 15 are then soldered to the painted cross sections and the anode 5 and the part 3 are then connected to a power supply 7 of about 10 volts. Points of measurement 19 equidistantly spaced from the surface of the part a distance of about 0.25″ are marked on the conductive sheet 1 and a test probe 11 is then used to measure the voltage drop between the point of measurement and the corresponding point on the part, the voltage drop being readable directly on a voltmeter 9 of the high impedance type connected to the part. As noted above the voltage drop is directly proportional to the current density at the corresponding point. The voltmeter may of course be alternatively connected to the anode 5, in which case the measured voltage would have to be subtracted from the source voltage to obtain the desired voltage drop value.

We have also found that the voltage gradient with reference to a point on the part being investigated may be determined by measuring the voltage drop between two spaced points 21 on the conducting sheet on a line perpendicular to the tangent at and close to the point on the part. The distribution of the current density along the surface of the part may be obtained by taking such measurements along the entire surface, the space between the two points of measurement being a small predetermined amount such as about 0.25″. We have found that it is not necessary to maintain the points of measurement 21 equidistantly spaced from the surface of the part. These measurements may be taken by using two probes connected across a voltmeter.

A still further method for determining the current density is that of determining the distance between a point on the part 3 and a point on the paper 1, measured on a line perpendicular to the tangent at the point on the part, required to produce a predetermined voltage drop. The distance so obtained is inversely proportional to the current density at the point on the part.

This test can be applied to accomplish substantial savings, the tests being applicable to obtain a better quality of plate and greater economy of operation through an increase in capacity of plating racks by closer spacing of parts and shorter plating cycles and through the saving of metal by more uniform plate distribution. More uniform plate distribution can be obtained by determining the effect of various designs of shields, racks, conforming anodes, auxiliary anodes and of bipolar anodes, the optimum design of any one component of combination of components being selected for tank usage.

By performing comparative tests on a bumper cross section to determine the effect of a shield positioned in the plating tank, such as shown in the test layout of the drawing, a 60% improvement in the plate distribution over the bumper was achieved. The distribution on the unshielded bumper was determined by the preferred test method of our invention and the ratio of maximum plate thickness to minimum plate thickness was found to be 3.7 to 1.0. After a series of tests it was found that by placing a shield in front of the highest point A on the bumper, as shown in the drawing, and one behind the bumper (not shown) with its ends projecting toward the anode with one end extending in front of the low section B of the bumper, the ratio was reduced to 2.0 to 1.0. Final testing of the shield was done in the plating tank and the results showed very good correlation of actual to predicted plate distribution.

The use of the shield developed by our test method thus results in substantial savings in plating metals. Similarly, the use of the described shield greatly reduced the range of current densities over the surface of the part. An evaluation of the current distribution on the bumper cross section showed that it was possible to double the current and therefore the plating rate without exceeding the maximum current density in the plating range.

It is apparent from the foregoing description that we have developed a simple 2-dimensional analog method for predicting the current distribution across a part in an electroplating tank with the result that different proposed plating tank layouts may be tested simply and expeditiously. While we have described our invention in terms of a preferred embodiment, modifications thereof may be apparent to those skilled in the art and it is intended that such modifications be within the scope of the claims which follow.

We claim:

1. The method of predicting current distribution over the cross section of a part to be plated in an electroplating tank comprising the steps of applying conducting material upon a conducting surface having a lesser conductivity than that of the conducting material to represent the cross section of the part and thus serve as an analog electrode of the plating system, applying conducting material upon said conducting surface to represent the cross section of the anode which thus serves as another analog electrode of the plating system, the painted anode being in the same relative position with respect to the part as it would have in the proposed tank layout, passing a current between the analog electrodes, and contacting the conducting surface with a voltmeter probe with reference to a point on the part and at a small distance away therefrom, the voltage drop with reference to the point on the part being directly proportional to the current density at the point on the part.

2. The method in accordance with claim 1 including the step of breaking the continuity of said conducting surface to simulate a shield for blocking the flow of current in the tank, the relative location and design of the break in the conducting surface being the same as it would have in the proposed tank layout.

3. The method as set forth in claim 1 wherein the probe is adapted to make contact with the conducting surface at two points spaced apart a predetermined small distance and close to the point on the part.

4. The method as set forth in claim 3 wherein the distance between the two points is about 0.25 inch.

5. The method as set forth in claim 1 wherein the distance from the point on the part at which the voltage drop reading is taken is relatively short but sufficiently spaced therefrom as to enable an accurate measurement of voltage drop which is proportional to the current density at the point on the part.

6. The method as set forth in claim 5 wherein the distance is about 0.25 inch.

7. The method as set forth in claim 5 wherein the distance is about 0.25 inch and the conducting material comprises a conducting coating.

8. The method of predicting current distribution over the cross section of a part to be plated in an electroplating tank comprising the steps of applying silver paint upon a conducting paper sheet having a lesser conductivity than that of the silver paint to represent the cross section of the part, applying silver paint upon said conducting paper sheet to represent the cross section of the anode in the same relative position with respect to the part as they would have in the proposed tank layout, securing a conducting wire over the cross section of the part and the anode, cutting a portion out of said sheet to simulate a shield for blocking the flow of current in the tank, the relative location and design of the break in the conducting sheet being the same as it would have in the proposed tank layout, passing a current between the painted electrodes, and contacting the conducting sheet with a voltmeter probe with reference to a point on the part and spaced apart therefrom a distance of about 0.25 inch on a line substantially perpendicular to the tangent to the point on the part, the voltage drop being directly proportional to the current density at the point on the part.

References Cited in the file of this patent

UNITED STATES PATENTS

| | | |
|---|---|---|
| 2,542,478 | Clark | Feb. 20, 1951 |
| 2,839,246 | Andrews | June 17, 1958 |

OTHER REFERENCES

Industrial Laboratories (Helm et al.), September 1953, pages 122–124.

Analog Methods in Computation and Simulation (Soroka), 1954, pages 359–366.

Gilmont et al.: New Design of an Electrolytic Cell for the Study of Electroplating Phenomena, Journal of the Electro-Chemical Society (October 1956), vol. 103, No. 10.

UNITED STATES PATENT OFFICE

CERTIFICATE OF CORRECTION

Patent No. 3,128,371

April 7, 1964

Robert A. Spaulding et al.

It is hereby certified that error appears in the above numbered patent requiring correction and that the said Letters Patent should read as corrected below.

Column 1, line 42, for "In is a" read -- It is a --; lines 49 and 50, strike out "upon a conducting material"; column 2, line 48, for "proportion" read -- proportional --; column 4, line 1, for "of", second occurrence, read -- or --.

Signed and sealed this 28th day of July 1964.

(SEAL)

Attest:

ESTON G. JOHNSON
Attesting Officer

EDWARD J. BRENNER
Commissioner of Patents